No. 760,927. PATENTED MAY 24, 1904.
R. A. SHAFER.
FLEXIBLE SHAFT.
APPLICATION FILED APR. 16, 1903.
NO MODEL.
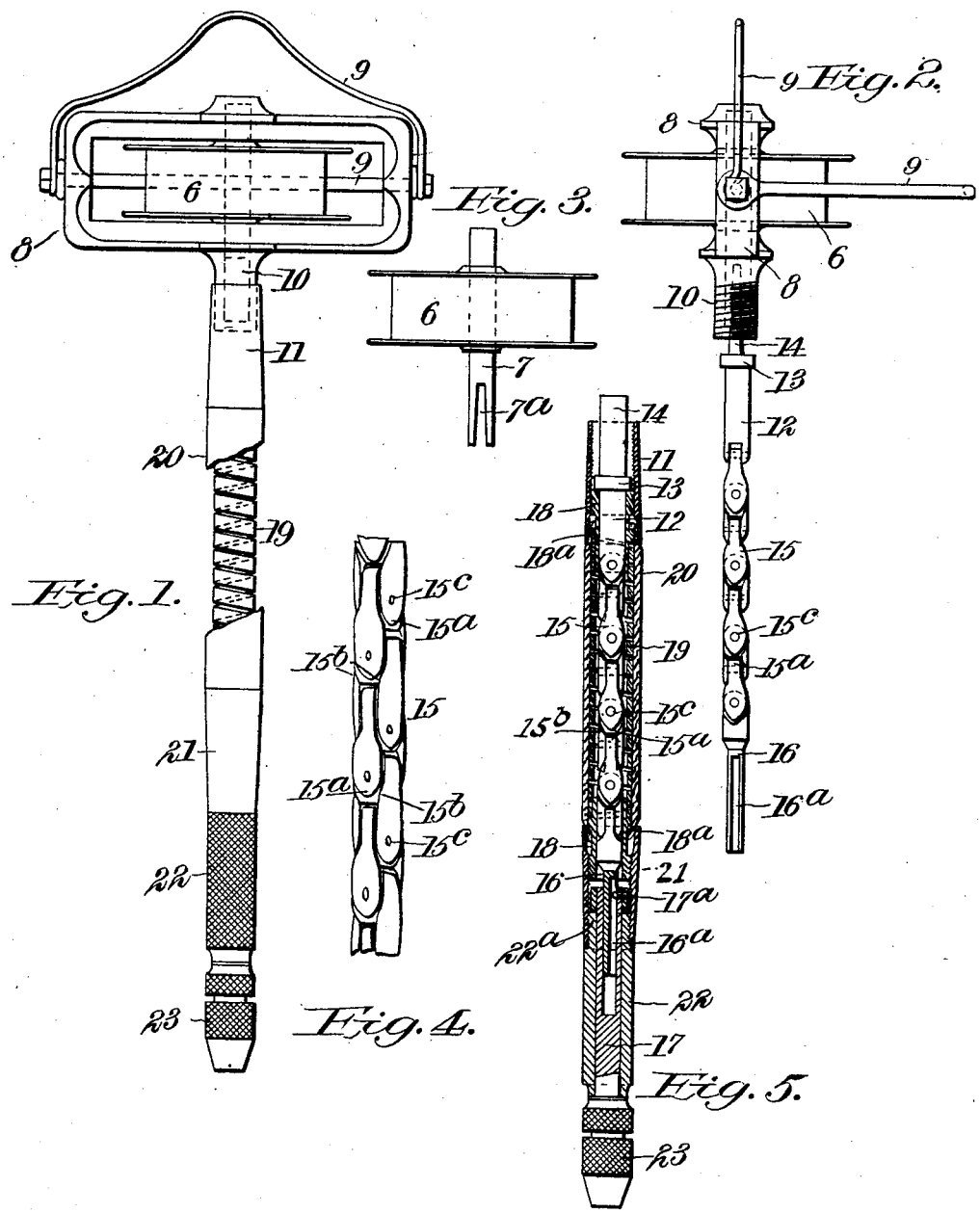
Witnesses
C. H. Walker
Geo. E. Few
Inventor
Riley A. Shafer
By Milo B. Stevens & Co.
Attorneys
THE NORRIS PETERS CO., PHOTO-LITHO., WASHINGTON, D. C.

No. 760,927. Patented May 24, 1904.

UNITED STATES PATENT OFFICE.

RILEY ABRAHAM SHAFER, OF BELLEFONTAINE, OHIO, ASSIGNOR TO THE FLEXIBLE SHAFT & TOOL CO., OF BELLEFONTAINE, OHIO, A CORPORATION OF OHIO.

FLEXIBLE SHAFT.

SPECIFICATION forming part of Letters Patent No. 760,927, dated May 24, 1904.

Application filed April 16, 1903. Serial No. 152,919. (No model.)

*To all whom it may concern:*

Be it known that I, RILEY ABRAHAM SHAFER, a citizen of the United States, residing at Bellefontaine, in the county of Logan and State of Ohio, have invented certain new and useful Improvements in Flexible Shafts; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to flexible shafting, and particularly to that kind thereof formed by a chain contained in a housing.

The object of the invention is to form an improved chain for the purpose and also an improved housing and also improved means for connecting the shaft to a pulley and to a bit-stock or tool.

In the accompanying drawings, Figure 1 is a side elevation of the apparatus with part of the leather covering of the shaft broken away. Fig. 2 is a side elevation at right angles to Fig. 1 with the shaft-covering and bit-stock removed. Fig. 3 is a detail of the pulley and its shaft. Fig. 4 is a detail perspective of a section of the chain, and Fig. 5 is a longitudinal section of the shaft and its covering.

The invention is particularly designed for use in connection with screw-drivers, augers, and other woodworking-tools in which the shaft and tool are driven by overhead belting. For this purpose the shaft is shown in connection with a tool and supported in a swiveling hanger.

Referring specifically to the drawings, 6 indicates a pulley the shaft 7 of which is supported in suitable bearings in a hanger 8, which is hung by bails 9 to swivel or swing therein to a certain extent. The lower bearing of the hanger is extended to form a nipple 10, which is threaded to receive the coupling-sleeve 11, which connects one end of the flexible shaft-housing to the hanger.

At 12 is indicated the end coupling-piece of the flexible shaft, having a collar 13 and a tongue 14, which enters and forms a joint in the split end $7^a$ of the shaft 7. This joint is advantageous, since it will slip and disjoint if the sleeve 11 should become unscrewed, thereby preventing thrashing of the shaft and possible injury to the operator.

The chain 15 is joined at one end to the end piece 12 and at the other end to a spindle 16, which has a longitudinal groove $16^a$ to receive and couple with the pin $17^a$ in the socket of the bit-stock spindle 17.

The construction of the chain is peculiar in that the links are so formed that it cannot buckle, although permitting flexion to a certain extent in all directions. The point $15^a$ of each link is entered between flanges $15^b$, projecting from the side of the next link and there connected by a pivot-pin $15^c$. The space between the flanges is sufficient to permit a certain amount of bending on the pivot, when the point $15^a$ will strike one of the flanges and prevent further bend. The play is sufficient to give the desired flexibility to the shaft, but insufficient to permit buckle of the chain. The successive pivots are at a right angle to each other, and the points $15^a$ are at one end of the link, and the flanges $15^b$ project from opposite sides of the link and have a space therebetween, into which the points are entered.

The shaft-housing comprises end tubes 18, a spiral ribbon-spring 19, and a tubular leather covering 20 over the spring. The ends of the spring fit tightly over the inner ends of the tubes 18, and the outer ends of said tubes are threaded to engage within the sleeve 11 at the pulley end and the sleeve 21 at the tool end. The ends of the leather tube 20 are drawn over shoulders $18^a$, produced on the end tubes, and are clamped under the sleeves 11 and 21 when they are screwed on the tubes. An oil-tight strong housing is thus formed, which will wear a long time.

The tubes 18 form bearings for the spindles 12 and 16. When the parts are assembled, the shaft being within the housing, the coupling 11 is screwed onto the nipple 10, with the shoulder 13 bearing against the end of the tube 18. This insures the connection between the tongue 14 and shaft 7 and permits free rotation of the flexible shaft within the housing.

The bit-stock comprises, in addition to its spindle 17, a handpiece 22, sleeved over the spindle, and a socket 23, rigidly fixed to the spindle. The inner end of the handpiece is reduced and threaded, as at $22^a$, to couple with the sleeve 21.

It will be seen that the rotating parts are entirely covered from the pulley to the socket of the bit-stock. There is thus no possibility of any injury to the operator by being caught in the shaft nor of burning the hands on high-speed tools.

What I claim as new, and desire to secure by Letters Patent, is—

1. In a flexible shaft, a chain comprising links pivoted together at the ends, the successive pivots being at a right angle to each other, each link having flanges $15^b$ which project laterally on opposite sides of the link and are spaced apart, and said link also having at one end a point $15^a$ which projects lengthwise beyond the pivot at that end and extends into the space between the flanges of the next link.

2. A flexible shaft comprising end pieces and a chain between the same, tubes 18 containing the end pieces and forming bearings therefor, said tubes being exteriorly threaded on their outer ends, a spiral metal ribbon connected to the inner ends of the tubes and wound around the chain, a flexible covering extending over the ribbon and over the inner ends of the tubes, and coupling-sleeves screwed onto the threaded ends of the said tubes and extending over the covering, clamping the same to the tubes.

In testimony whereof I affix my signature in presence of two witnesses.

RILEY ABRAHAM SHAFER.

Witnesses:
H. J. MILLER,
J. A. HAEK.